June 24, 1924.
A. KÉGRESSE
DRIVING PULLEY FOR ENDLESS FLEXIBLE TRACK BELTS
Filed April 27, 1923
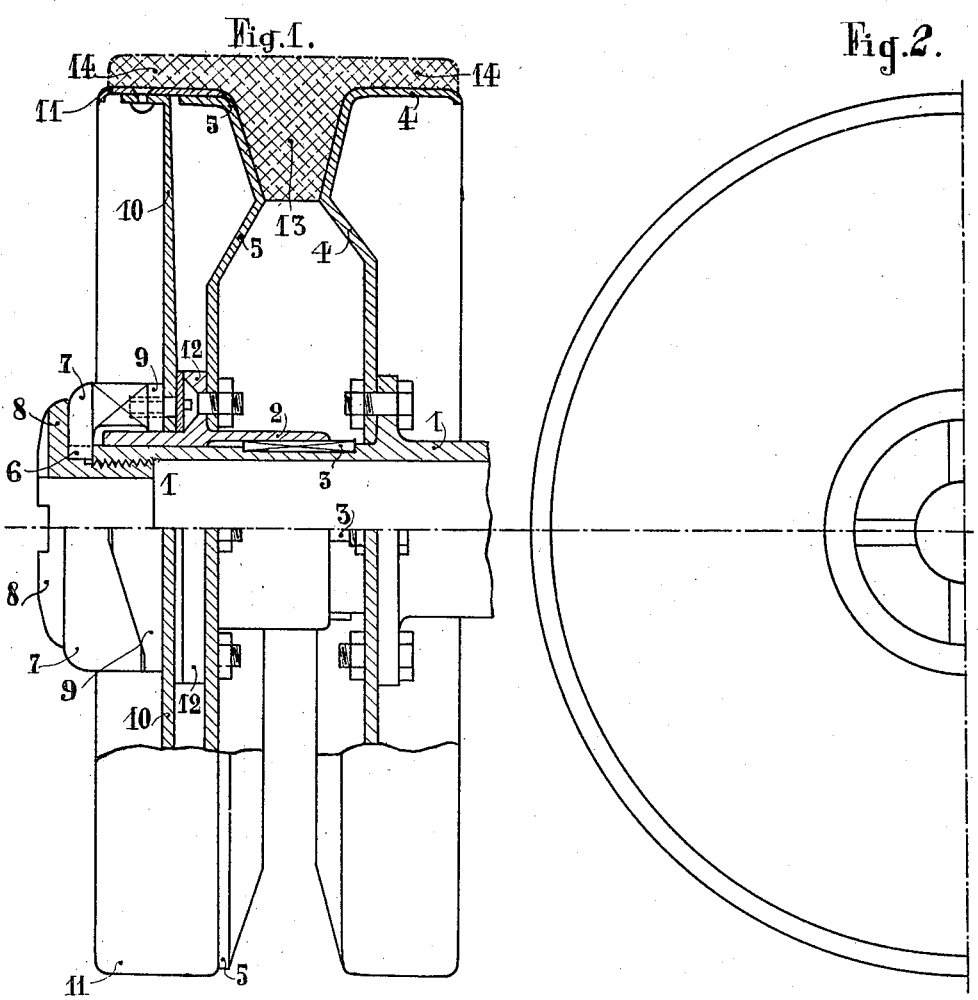
INVENTOR:
Adolphe Kégresse
BY
ATTORNEY Patented June 24, 1924.

1,499,058

UNITED STATES PATENT OFFICE.

ADOLPHE KÉGRESSE, OF PARIS, FRANCE.

DRIVING PULLEY FOR ENDLESS FLEXIBLE TRACK BELTS.

Application filed April 27, 1923. Serial No. 635,052.

*To all whom it may concern:*

Be it known that I, ADOLPHE KÉGRESSE, a citizen of the Republic of France, residing at Paris, Department of Seine, France, have invented certain new and useful Improvements in Driving Pulleys for Endless Flexible Track Belts, of which the following is a specification.

In endless track motor vehicles, the required adherence of the flexible endless track belt to the driving wheels is produced either by mere tension or by means of a hub designed for the purpose and whereby the two halves or cheeks forming the driving wheel are pressed by the driving power against the sides of the projection or inner rib of the T-shape belt. The vehicle being adapted to travel over any kind of ground, the coefficient of adherence of the endless belt on the driving wheel varies within wide limits according to the nature of the surface over which the said vehicle moves. In thawing snow or mud for instance, the coefficient of adherence is much lower than when travelling in sand. Consequently, the grip on the endless belt should be altered accordingly. In other words it should be tighter on greasy and slippery ground than when the latter is dry or sandy.

The present invention relates to a driving wheel for endless track belts of the above type which is so constructed as to provide for an automatic gripping of the belt by the two main members of the wheel to the required extent, irrespective of the character of the ground over which the vehicle is travelling; the invention being essentially in the nature of an improvement on, or development of, the construction disclosed in my prior application, No. 457,109, filed March 30, 1921, patented January 8, 1924, No. 1,480,078, and corresponding to my French patent of April 3, 1917, No. 494,526.

According to this invention, the earlier construction is modified to the extent that one of the two main members of the wheel is fixed to and driven by the axle, while the other is driven from the axle through the intermediary of a hub to which it is directly fastened; the aforesaid hub being keyed to the axle to slide thereon toward the fixed member so as to exert the desired gripping pressure against the belt rib. The sliding movement of the hub is designed to take place automatically when slippage of the belt occurs, and is preferably effected by means of coacting sets of inclined thrust surfaces or cams provided on two complemental or companion parts or members, one rigidly connected to the driving axle and the other to a web which is loosely mounted on the sliding hub; the arrangement being such that when relative movement between the two parts takes place, the coaction of the thrust surfaces serves to cam or force the hub and its wheel member toward the other wheel member.

A wheel according to the invention is illustrated by way of example in the accompanying drawings, in which:

Figure 1 is a transverse section of the wheel,

Figure 2 shows one half of the wheel in side elevation.

An axially movable hub 2 has an easy running fit on the driving shaft or axle 1 (Figure 1) which rotates the said hub through loosely mounted keys 3, so that the hub is adapted to move axially within limits on the axle, to which one cheek 4 of the wheel is rigidly secured. The hub 2 carries the other cheek 5, the rim of which is of smaller diameter and is narrower than that of the cheek 4. The outer end of the shaft 1 has suitable teeth 6 and is adapted to rotate a disc 7 one of the faces of which is provided with inclined thrust surfaces, the other face being flat and bearing against a nut or member 8 secured to the shaft 1. The thrust surfaces of the disc 7 are in contact with correspondingly shaped faces of the disc 9 secured to the web 10 of the rim 11, loosely mounted on the cheek 5 of the wheel. The disc 9 and the web 10 have an easy fit on the hub 2 and merely bear against the flange 12 of the latter. The inner rib or central projection 13 of the endless belt has an accurate fit between the two wheel cheeks 4 and 5. The flat portions 14 of the belt rest on the cheek 4 and on the false rim 11.

The apparatus works as follows: When the two cheeks 4 and 5 of the wheel slip on the endless belt owing to lack of adherence, they move through a certain angle relatively to the rim 11 since the latter is not driven by the shaft, but is in close contact with the belt. The disc 7 rigidly secured to the driving shaft 1 is thus shifted relatively to the other disc 9 rigidly connected to the rim 11 through the web 10. It will be readily gathered that the relative shift of the two discs moves the wheel cheek 5 towards the cheek 4 and increases the grip of the wheel on the rib 13 of the flexible belt.

Having now particularly described and ascertained the nature of my said invention as well as the manner in which the same is to be performed, what I claim as new is:

1. A driving wheel for endless flexible track belts of the type having a longitudinal projection or rib on the inner surface thereof, comprising two companion cheeks arranged in spaced relation to grip the belt rib between them, one cheek mounted on and secured to a driving axle to rotate therewith; a hub fitting on and slidably keyed to said axle to be driven thereby and to which the other cheek is secured; a pair of coacting thrust members having mutually-engaging cam surfaces, one thrust member being connected to be driven by the axle; and a support to which the other thrust member is secured, loosely mounted on and bearing against said hub and adapted to automatically force the same and the second-named cheek inward bodily along the axle toward the first cheek, consequent upon movement of the driven thrust member relative to the loose thrust member when slippage of the belt occurs.

2. A driving wheel for endless flexible track belts of the type having a longitudinal projection or rib on the inner surface thereof, comprising two companion cheeks arranged in spaced relation to grip the belt rib between them, one cheek mounted on and secured to a driving axle to rotate therewith; a hub fitting on and slidably keyed to said axle to be driven thereby and to which the other cheek is secured; a pair of juxtaposed disks having complemental inclined thrust surfaces on their inner faces, one disk being fixed to the axle, and the other disk loosely encircling the hub; and a support to which said other disk is secured loosely mounted on and bearing against said hub and adapted to force the same and the second-named cheek inward bodily along the axle toward the first cheek, consequent upon rotary movement of the driven disk relative to the loose disk when slippage of the belt occurs.

3. A driving wheel for endless flexible track belts of the type having a longitudinal projection or rib on the inner surface thereof, comprising two companion cheeks arranged in spaced relation to grip the belt rib between them, one cheek mounted on and secured to a driving axle to rotate therewith; a hub fitting on and slidably keyed to said axle to be driven thereby and to which the other cheek is secured, said hub having a laterally-projecting circumferential flange intermediate its ends; a pair of coacting thrust members having mutually-engaging cam surfaces, one thrust member being connected to be driven by the axle; and a web to which the other thrust member is secured loosely encircling the hub and bearing against the outer face of said flange, so as to automatically force said hub and the second-named cheek inward bodily along the axle toward the first cheek, consequent upon movement of the driven thrust member relative to the loose thrust member when slippage of the belt occurs.

In testimony whereof I affix my signature.

ADOLPHE KÉGRESSE.